(12) United States Patent
Crosley

(10) Patent No.: US 11,461,370 B2
(45) Date of Patent: Oct. 4, 2022

(54) EVENT AND LOCATION TRACKING AND MANAGEMENT SYSTEM AND METHOD

(71) Applicant: Jay Crosley, Seattle, WA (US)

(72) Inventor: Jay Crosley, Seattle, WA (US)

( * ) Notice: Subject to any disclaimer, the term of this patent is extended or adjusted under 35 U.S.C. 154(b) by 135 days.

(21) Appl. No.: 16/275,708

(22) Filed: Feb. 14, 2019

(65) Prior Publication Data

US 2019/0251098 A1 Aug. 15, 2019

Related U.S. Application Data

(60) Provisional application No. 62/630,246, filed on Feb. 14, 2018.

(51) Int. Cl.
*G06F 16/28* (2019.01)
*G06F 9/54* (2006.01)
*G06F 16/29* (2019.01)
*G06Q 50/00* (2012.01)

(52) U.S. Cl.
CPC .......... *G06F 16/285* (2019.01); *G06F 9/542* (2013.01); *G06F 16/29* (2019.01); *G06Q 50/01* (2013.01)

(58) Field of Classification Search
CPC ........ G06F 16/285; G06F 9/542; G06F 16/29; G06Q 50/01
See application file for complete search history.

(56) References Cited

U.S. PATENT DOCUMENTS

| | | | | |
|---|---|---|---|---|
| 9,552,334 B1* | 1/2017 | Meisels | ................ | G06Q 50/01 |
| 10,129,699 B1* | 11/2018 | Vahidi | ................ | H04W 4/023 |
| 10,417,613 B1* | 9/2019 | Brisebois | ........... | G06Q 10/1095 |
| 10,979,870 B1* | 4/2021 | Zhang | ................ | H04W 4/02 |
| 2010/0118025 A1* | 5/2010 | Smith | ................ | G06Q 30/02 345/418 |
| 2011/0270642 A1* | 11/2011 | Schultz | ................ | G06Q 10/109 705/7.18 |
| 2013/0211980 A1* | 8/2013 | Heiferman | ............. | G06Q 50/01 705/30 |
| 2013/0254312 A1* | 9/2013 | Maheshwari | .......... | G06Q 30/01 709/206 |
| 2013/0282421 A1* | 10/2013 | Graff | ................ | H04L 63/08 705/7.18 |
| 2014/0365111 A1* | 12/2014 | McClernon | ............ | G01C 21/20 701/409 |
| 2016/0019465 A1* | 1/2016 | Milton | ................ | G06Q 30/0201 706/52 |
| 2016/0034480 A1* | 2/2016 | Seth | ................ | G06F 16/9537 707/724 |
| 2016/0196577 A1* | 7/2016 | Reese | ................ | H04W 4/023 705/14.5 |

* cited by examiner

*Primary Examiner* — Ashish Thomas
*Assistant Examiner* — Yohanes D Kelemework
(74) *Attorney, Agent, or Firm* — Christopher Mayle; Bold IP, PLLC

(57) ABSTRACT

A system and method for building an event location database to identify and manage information pertaining to "unknown unknowns" such as events and host locations with no online presence and locations that never host any events, the system building the event location database by cataloging locations that host events and locations that do not host events, and subsequently cataloging events so that when the system receives input georeferenced discrete locations and subsequently metadata about their events, the system develops a more complete list of which locations have events that were previously unknown to potential event attendees.

13 Claims, 11 Drawing Sheets

| Node type | Data | Visual representation |
|---|---|---|
| root_square (represents a grid square on the map which has been subdivided into more grid squares) | a representation of the geographic area:<br>• top_left_latitude<br>• top_left_longitude<br>• bottom_right_latitude<br>• bottom_right_longitude<br>metadata about the contained locations:<br>• has_event_count<br>• has_no_event_count<br>• never_has_event_count<br>• total_event_count<br>a structure which contains pointers to child squares or root_squares | 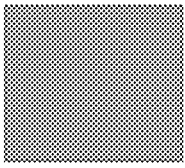 |
| Square (represents a grid square which has not been subdivided; children of square are individual locations) | a representation of the geographic area:<br>• top_left_latitude<br>• top_left_longitude<br>• bottom_right_latitude<br>• bottom_right_longitude<br>metadata about the contained locations:<br>• has_event_count<br>• has_no_event_count<br>• never_has_event_count<br>• total_event_count<br>a structure which contains pointers to child locations |  |
| location (represents information about a single location) | information about the location:<br>• latitude<br>• longitude<br>metadata about the location<br>• hosts_events<br>• event_count | 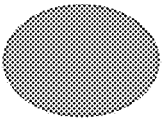 |
| Event (represents an event) | information about the event:<br>• event_name<br>• event_description<br>• provider_event_id (to avoid duplication) | 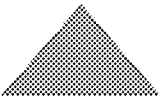 |

FIG 6

EVENT AND LOCATION TRACKING AND MANAGEMENT SYSTEM AND METHOD

CROSS REFERENCE TO RELATED APPLICATION

This application claims priority to a prior-filed provisional application Ser. No. 62/630,246 filed on Feb. 14, 2018.

FIELD OF DISCLOSURE

The overall field of this invention is directed to automated data capturing and more particularly a system and method to determine which events are not being identified in a geographical region whereby the events then may be systematically added, thus improving database size and accuracy, and for the events identified, improving the accuracy of event turnout based on the status of participants who commit to attending the event.

BACKGROUND

Customarily many events, such as shows or sporting events, are typically held in large event venues, such as stadiums or arenas but many events occur in more intimate or smaller venues. This makes it more difficult to keep track of all upcoming events in the area. With the advent of social networking systems in the form of applications and websites, advancements in identifying and locating different events in a specific area have become more prevalent. The applications and websites are usually designed to list events in a city, near a latitude/longitude coordinate, or targeted toward a specific interest based on a user's profile. Often such social networking systems gather information about events in a few ways. They either gather the information by asking users to input events they know about, by providing HTML tags which may be added to websites that specify event information; or even by copying event information from other third-party websites. These methods often involve someone advertising their event in some way, so they all end up with somewhat similar lists of events—the events that the organizers took the time to advertise.

Many events in the world never end up on any applications or websites. These tend to be the smaller, local events—the trivia night at the local bar; the Bible study at the local church; the weekly pickup game at the local basketball court. The businesses or facilities hosting these events may or may not put the events on a calendar on their websites, but rarely input them to the many events applications, which aggregate all events. Some businesses even stand by using a physical medium method to display their events such as a sign-up sheet on a bulletin board. Thus, a large information gap exists between event information that is conveniently posted online by event organizers and events and host locations that have no online presence. Events and host locations with no online presence, as well as locations that never host any events make up a group of "unknown unknowns." The initial and ongoing amount of effort and resources needed to define the size of a comprehensive set of data and attempt to enter and manage information pertaining to it on a citywide, statewide, nationwide, and global scale makes the proposition infeasible using conventional database server system architectures.

Many social networking systems that list events give the users an option to "join" the event, which adds them to a list of attendees. Sometimes an event host might not want to have an event unless it reaches a minimum threshold of attendees for financial or entertainment reasons. For example, an event host might not want to commit to hosting a baseball game unless the event host has at least 18 people committed to the event.

Additionally, hosting an event requiring a minimum number of people and having people interested in attending pledge their commitment to attend is no guarantee that everyone who commits to attending an event will actually attend. For example, if an event host requires 18 people to play a baseball game, and triggers the event when 18 people commit, but due to various event and/or personal factors each person only has a 50% chance of actually attending, likely only about 9 people will end up actually attending. The outcome of fewer than the required minimum number of people actually attending is also contrary to the actual attendees' best interests, because the actual attendees took time to commit and participate in an event which is infeasible due to lack of actual attendees.

Thus exists a need for a system and method to define a comprehensive set of data and enter and manage information pertaining to events and host locations with no online presence as well as locations that never host any events while also improving the accuracy of event turnout based on the status of participants who commit to attending the event.

SUMMARY

In one aspect, embodiments in the present description are provided are directed to a computer implemented method of building and refining the event and location information database, said method comprising, generating a map by one or more processors, partitioning the map into an initial grid that is composed of one or more first regions having a certain area, receiving a location corresponding to a real world geographical location, identifying a first region into which location is insertable whereby the location is located within that first region, when one of the first regions has a certain number of locations inserted and an occurrence happens; performing a region subdivision scheme, which creates one or more second regions from the first region, the second regions smaller than the first region, ranking, the first regions as the higher level region and second region as the lower level region such that if the location is inserted into first region and it is determined that the one or more second regions have been created from the region subdivision scheme of the first region, traversing location down the ranking and inserting location into the second region, inserting an event for the location; and in response to inserting the event for the location, the occurrence of the event becoming visible upwards through the rankings from the second region to the first region.

In another embodiment, a computer system comprising a non-transitory computer readable storage medium having instructions encoded thereon that, when executed by one or more processors, cause the one or more processors to, generate a map, partition the map into an initial grid that is composed of one or more first regions having a certain area, receive a location corresponding to a real world geographical location, identify a first region into which location is insertable wherein the location is located within that first region, when one of the first regions has a certain number of locations inserted and an occurrence happens, perform a region subdivision scheme, which creates one or more second regions from the first region, the second regions smaller than the first region, rank, the first regions as the higher level region and second region as the lower level region such that if the location is inserted into first region and it is determined that the one or more second regions have been created from the region subdivision scheme of the first region, traversing location down the ranking and inserting location into the second region, insert an event for the location; and in response to inserting the event for the location, the occurrence of the event becoming visible upwards through the rankings from the second region to the first region, repeat said receive and identify using said first and second regions wherein if the one or more second regions has a certain number of locations and the occurrence happens, a region subdivision scheme is performed, creating one or more third regions from the second region, rank, the second regions as the higher level region and third region as the lower level region such that if the location is inserted into second region and it is determined that the one or more third regions have been created from the region subdivision scheme of the second region, traversing the location down the ranking and inserting location into the third region, insert an event for the location; and in response to inserting the event for the location, the occurrence of the event visible up the ranking from the third region to the second region to the first region.

BRIEF DESCRIPTION OF DRAWINGS

The present invention will be described by way of exemplary embodiments, but not limitations, illustrated in the accompanying drawings in which like references denote similar elements, and in which:

FIG. 6 depicts a table explaining significance behind organizational choices.

DETAILED DESCRIPTION

Figure 1:
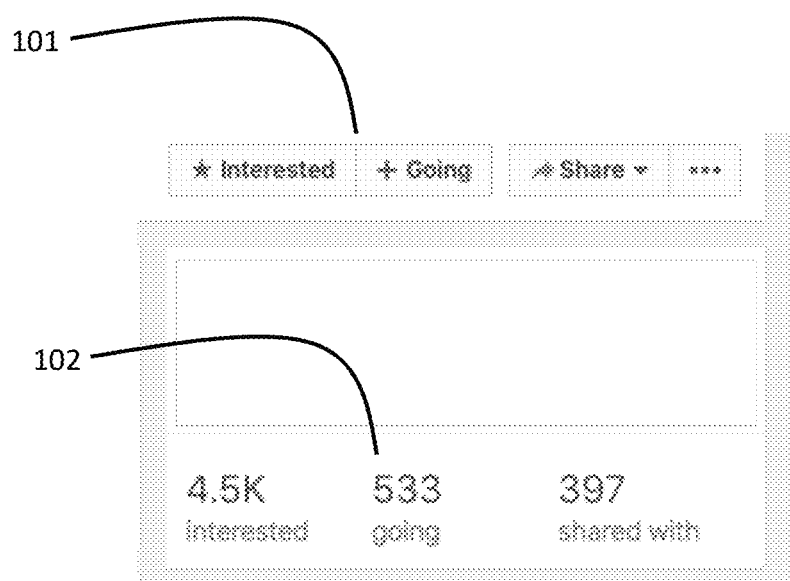
FIG. 1 depicts an example of previous art in the form of Facebook® event reply information interface.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature may also be used, to the extent possible, in combination with and/or in the context of other particular aspects and embodiments of the invention, and in the invention generally.

Where reference is made herein to a method comprising two or more defined steps, the defined steps may be carried out in any order or simultaneously (except where the context excludes that possibility), and the method may include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

The present disclosure recognizes the unsolved need for building a robust database to identify and manage information pertaining to "unknown unknowns" such as events and host locations with no online presence and locations that never host any events. FIG. 1 illustrates prior art in the form of Facebook Real Time Monitoring of events with buttons 101 and attendee 102. However this is rudimentary and only a small amount of data has been captured. Building a more robust database of events for the system begins with the insight that most events happen at a location. The system is designed to gather and house event information and store as a primary concern, the locations that host events. Accordingly, in one or more non-limiting embodiments, the system builds the event location database by cataloging locations that host events and locations that do not host events, and subsequently cataloging events. By receiving input georeferenced discrete locations and subsequently metadata about their events, the system will develop a more complete list of which locations have events that were previously unknown to potential event attendees. In this context, discrete locations are georeferenced physical locations, as in a specific storefront's GPS coordinates. Additional metadata concerning location information may include but not limited to a physical address for a location.

Figure 2:
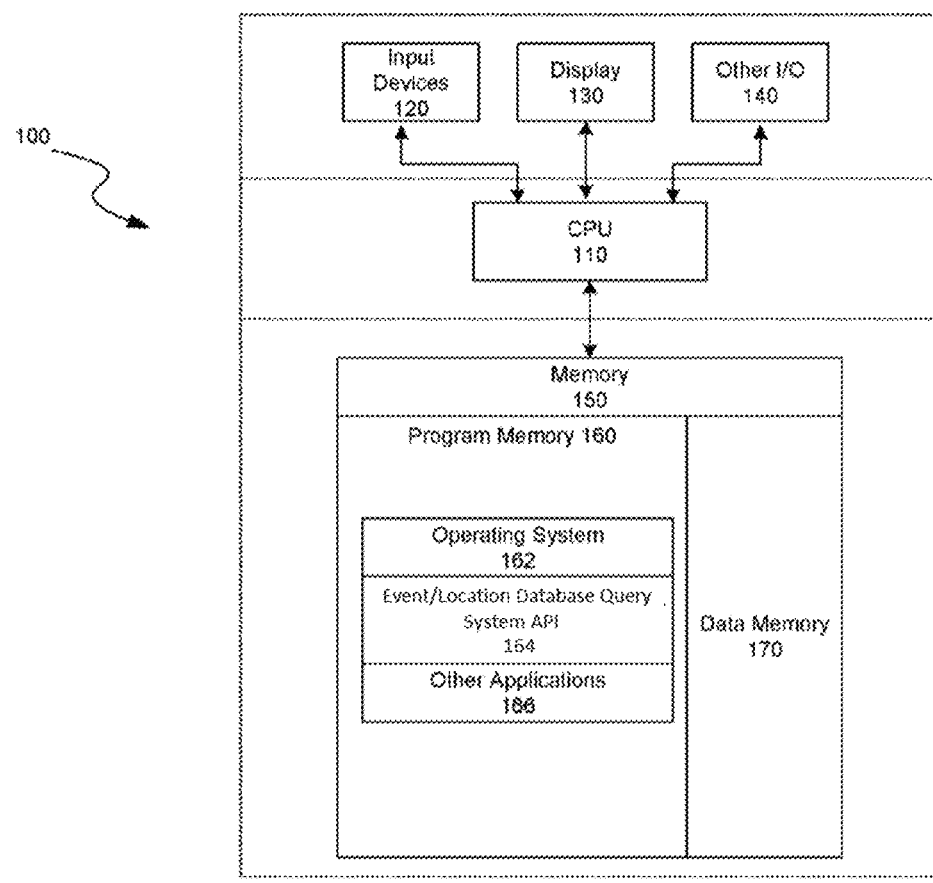
FIG. 2 depicts a block diagram illustrating an overview of devices on which some implementations can operate.

FIG. 2 is a block diagram illustrating an overview of devices on which some implementations of the disclosed technology may operate. The devices may comprise hardware components of a device such as device 100 that allows access to edit and query a system comprising an event and location information database. Device 100 may include one or more input devices such as input devices 120 that provide input to a CPU (processor) such as CPU 110, notifying it of actions. The actions may be mediated by a hardware controller that interprets the signals received from the input device and communicates the information to the CPU 110 using a communication protocol. Input devices 120 may include but are not limited to, a mouse, a keyboard, a touchscreen, an infrared sensor, a touchpad, a wearable input device, a camera- or image-based input device, a microphone, or other user input devices known by those of ordinary skill in the art.

CPU 110 may be a single processing unit or multiple processing units in a device or distributed across multiple devices. CPU 110 may be coupled to other hardware devices, for example, such as one or more memory devices, or with the use of a bus, such as a PCI bus or SCSI bus. CPU 110 may communicate with a hardware controller for devices, such as for a display such as display 130. Display 130 may be used to display text and graphics. In some examples, display 130 provides graphical and textual visual feedback to a user. In some implementations, display 130 may include input device 120 as part of the display, such as when input device 120 is a touchscreen or is equipped with an eye direction monitoring system. In some implementations, display 130 is separate from input device 120. Examples of display 130 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Other I/O devices such as I/O devices 140 may also be coupled to the processor, such as a network card, video card, audio card, USB, FireWire or other external device, camera, printer, speakers, CD-ROM drive, DVD drive, disk drive, or Blu-Ray device.

In some implementations, device 100 may also include a communication device capable of communicating wirelessly or wire-based with a network node. The communication device may communicate with another device or a server through a network using, for example, TCP/IP protocols. Device 100 may utilize the communication device to distribute operations across multiple network devices.

CPU 110 may have access to a memory such as memory 150. A memory may include one or more of various hardware devices for volatile and non-volatile storage and may include both read-only and writable memory. For example, memory 150 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 may include program memory such as program memory 160 capable of storing programs and software, such as an operating system such as operating system 162, event/location database query system API such as event/location database query system API 164, and other computerized programs or application programs such as application programs 166. Memory 150 may also include data memory such as data memory 170 that may include event and location information database query results, configuration data, settings, user options or preferences, etc., which may be provided to program memory 160 or any element of device 100.

Some implementations may be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or any computing systems in the "internet of things" applying the principle that as the world becomes more and more advanced, technology will evolve, and there will be newer types of devices 100.

Figure 3:
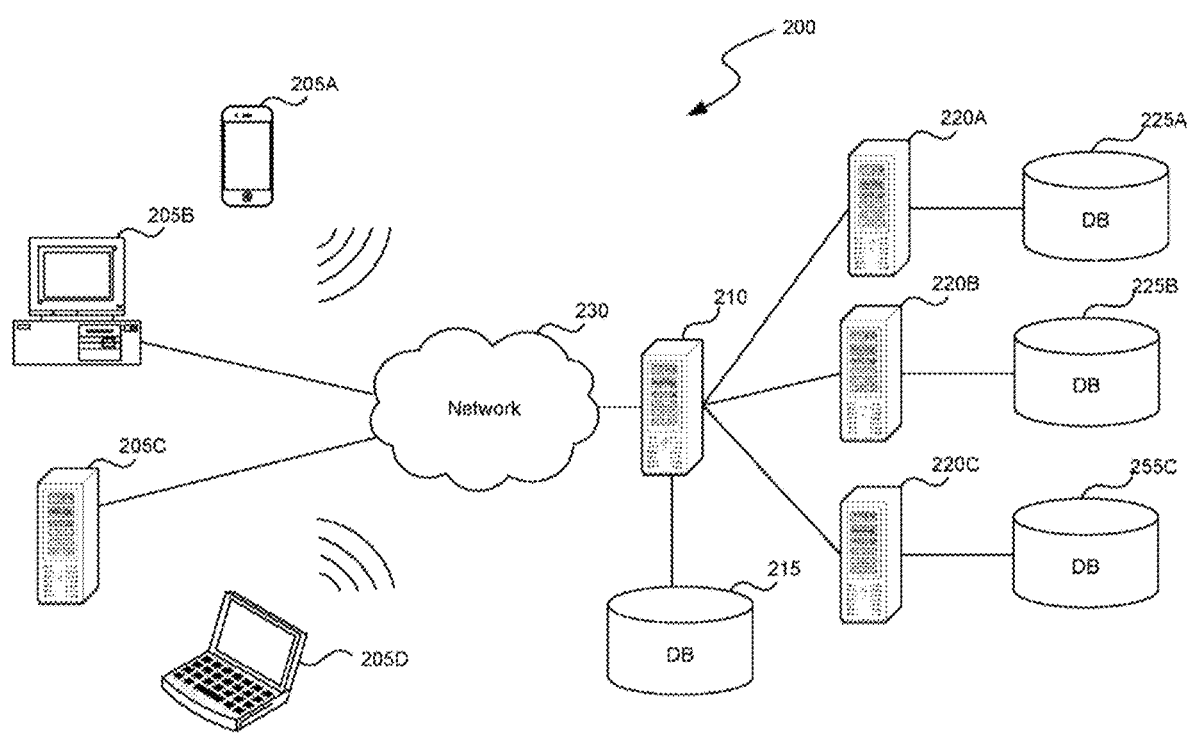
FIG. 3 depicts a block diagram illustrating an overview of an environment in which some embodiments of the disclosed technology can operate.

FIG. 3 is a block diagram illustrating an overview of a system such as system 200 in which some implementations of the disclosed technology may operate. System 200 may include one or more client computing devices such as client computing devices 205A-D, examples of which may include device 100 as discussed above and may be any device in the "internet of things." Client computing devices 205 may operate in a networked environment using logical connections through a network such as network 230 to one or more remote server computing devices, such as a server 210.

In some implementations, server 210 may be an edge server, which receives client requests and coordinates fulfillment of those requests through other servers, such as servers 220A-C. Servers 210, 220 A-C may comprise computing systems, such as device 100. Though each of servers 210, 220 A-C are displayed logically as a single server, they each may be a distributed computing environment encompassing multiple computing devices located at the same or at geographically disparate physical locations. In some implementations, each of servers 210, 220 A-C corresponds to a group of servers.

Client computing devices 205 and servers 210, 220 A-C may each act as a server or client to other server/client devices. Server 210 may connect to a database such as database 215. In one or more non-limiting embodiments, servers 220A-C may each connect to a corresponding database such as databases 225A-C. As discussed above, each server 220 A-C may correspond to a group of servers, and each of these servers may share a database or may have their own database. Databases 215, 225 A-C may store information such as the event and location information database, user profiles and records, authenticated client computing devices 205 information, event/location database query system, etc. Though databases 215, 225A-C are displayed logically as single units, databases 215, 225 A-C may each be a distributed computing environment encompassing multiple computing devices, may be located within their corresponding server, or may be located at the same or at geographically disparate physical locations.

Network 230 may be a local area network (LAN) or a wide area network (WAN), but may also be other wired or wireless networks. Network 230 may be in the form of the Internet or other public or private network. Network 230 may include mobile telephone networks utilizing any protocol or protocols used to communicate among mobile digital computing devices (e.g. computing device 104), such as GSM, GPRS, UMTS, AMPS, TDMA, or CDMA. In one or more non-limiting embodiments, different type of data may be transmitted via network 230 via different protocols. Network 230 may further include a system of terminals, gateways, and routers. Network 230 may employ one or more cellular access technologies including 2nd generation broadband cellular network technology (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if for instance they are in a remote location not accessible by other networks.

Client computing devices 205 may be connected to network 230 through a network interface, such as by wired or wireless communication. While the connections between servers 210 and 220 A-C are shown as separate connections, these connections may be any kind of local, wide area, wired, or wireless network, including network 230 or a separate public or private network.

In one or more non-limiting embodiments, clients are users of event/location database query system API 164, and event/location database query system API 164 may require a registration of a user account with the program host server computer before a query, upload, or other communication of data is permitted. Registration of the user account includes a verification step, such as a client confirmation email, sent to an email address a client may provide, and then respond to in an affirmative step. An example of an affirmative step is a client input requiring collecting an account activation code that is randomly generated and sent to the client-provided email address, and verification and receipt of the account activation code from client computing devices 205 by a program host server portal. The user account is then linked to the authenticated client computing devices 205 and provides access for authenticated client computing devices 205 to the program host server computer and provides identification information for each interaction of the user and authenticated client computing devices 205 with the program host server computer.

Figure 4:
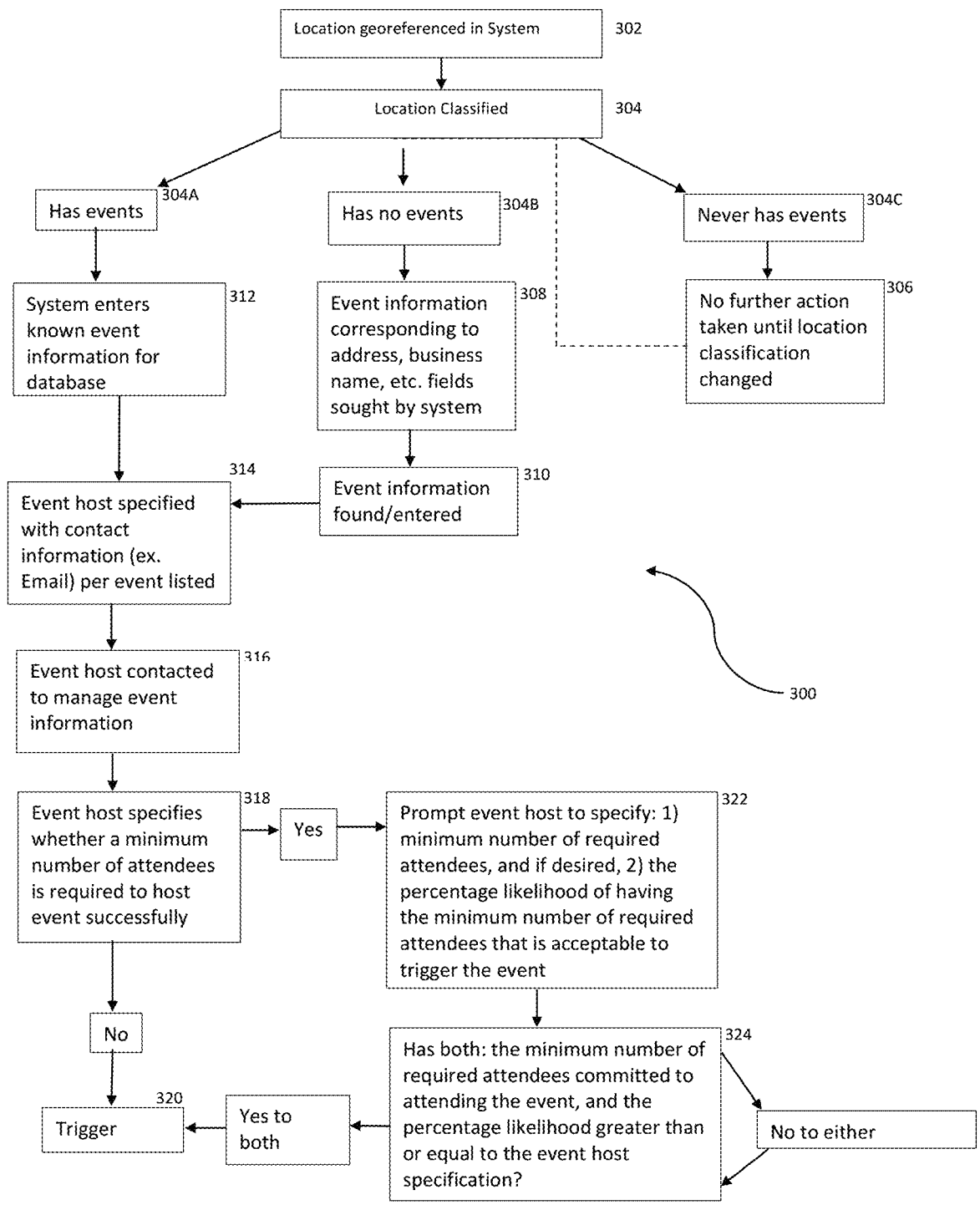
FIG. 4 depicts a flow diagram illustrating system steps in building and refining the event and location information.

FIG. 4 is flow diagram illustrating the significant steps in building and refining event and location information. To begin, databases 215, 225A-C receive input georeference information at step 302 for locations from network search methods, user input, or any other methods known by those of ordinary skill in the art which are then classified using one of the following three classes at step 304:

A location that has events step 304A, means that databases 215, 225A-C have information about upcoming events for this location; a location that has no events at 304B means databases 215, 225A-C do not have information about any upcoming events for this location; and a location never has events at 304C means databases 215, 225A-C received information that this location does not host events.

In one or more non-limiting embodiments, servers 210, 220 A-C receive input georeference information for locations in an area, the entry of such information creates records in a database such as databases 215, 225A-C as illustrated in FIG. 3, which will be discussed later in the specification. Building the catalog of locations or verifying the completeness of the catalog of georeferenced locations may be time intensive, whereby the next step of refining event information for individual locations may occur contemporaneously with the system's continued effort to investigate accuracy of the location catalog for the area. The next step comprises servers 210, 220 A-C classifying each georeferenced location. Locations known to have events are classified "has events" and servers 210, 220 A-C store information in databases 215, 225A-C about known events for each location 304A.

For locations under the class "has no events," servers 210, 220 A-C may utilize network search methods to verify whether the location hosts events at step 308 by running a cross-reference search via Internet, or some other open or closed information network, or a manually performed search in printed texts of event listings, local news or bulletin board listings, etc., to verify whether any events are listed on a website, or by the system sending an automated inquiry to an owner or manager at the location, or via another investigative method. If the location does not host events, it is reclassified "never has events" at step 306 whereby no further action taken until the location classification changed.

In one or more non-limiting embodiments, event/location database query system API 164 allows additional controls over management of events. Servers 210, 220 A-C learn of an event host associated with the event from either the user who submitted the event information at step 312 or via an automated search method at step 310. If either the user provided information or the automated search method return a contact method of the event host at step 314, for example, an email address, the event/location database query system API 164 contacts the host at step 316 for additional event information that may be specified by the host. For example, event/location database query system API 164 may require the event host to specify whether a minimum number of attendees is necessary for the event to take place, in such case the event host may specify the minimum number of attendees within the system at step 318.

Event/location database query system API 164 then triggers an event when it gets to a minimum threshold of attendees at step 320. Attendees are clients who have set up a user account and who wish to participate in events by committing to the event with their user account. The event/location database query system API 164 triggers an event by changing the event from a status of pending to locked. Event/location database query system API 164 sets an event status as pending when awaiting commitment for some needed resource, for example a minimum number of attendees, or a physical space to host the event, if needed.

Event/location database query API system 164 sets an event status as locked when the minimum resources to hold the event, as defined by the event host, have been committed to the event through event/location database query system API 164. Upon triggering the event, event/location database query system API 164 notifies all attendees committed to the event that the event has reached the minimum number of attendees committed, as specified by the event host, and has triggered. Event/location database query system API 164 may notify attendees directly on client computing devices 205, or event/location database query system API 164 may notify attendees by sending a communication containing event information identifying the particular event that the system has triggered to the user via a user-provided email address.

In one or more non-limiting embodiments, event/location database query system API 164 permits users to commit to multiple events happening at the same time, and automatically removes attendees' commitments from all other events when the first one committed has been triggered. In one or more non-limiting embodiments, servers 210, 220 A-C utilizing data in databases 215, 225A-C track individual attendee event attendance rates to create a projected likelihood of the attendance of the required minimum number based on the reliability of the committed individual attendees.

In one or more non-limiting embodiments, servers 210, 220 A-C using databases 215, 225A-C create records of attendance rates for each attendee and projects a probable attendance rate for each attendee. Servers 210, 220 A-C using databases 215, 225A-C track attendance for each attendee to a given event in at least one of the following ways: (1) Asking the attendee to check in to an event using event/location database query system API 164 on client computing device 205; (2) Verifying the attendee's location with GPS before or during or after an event the attendee was scheduled to attend through event/location database query system API 164 on client computing device 205; (3) Asking the event host to take attendance, reporting it to databases 215, 225A-C through event/location database query system API 164.

In one or more non-limiting embodiments, servers 210, 220 A-C use the attendee's attendance record information to determine a likely attendance rate for the attendee for a given event. The likely attendance rate may be based on the attendee's overall attendance rate, or it may take other factors into account, for example: the type of event, time of the event, attendee's attendance record for events on a particular day of the week, or attendee's attendance record for events at a particular time of day.

In one or more non-limiting embodiments, after servers 210, 220 A-C determine likely attendance rates for each attendee, servers 210, 220 A-C use the attendance rates for each attendee to determine and display to the event host a percentage likelihood that the event host-specified minimum number of attendees will actually attend at step 322. Additionally, event/location database query system API 164 offers to the event host the option to use an expected attendance threshold, below which the event host may avoid triggering an event unless the percentage likelihood that the event-host specified minimum number of attendees will actually attend is at least at a level the event host establishes as acceptable at step 324. For example, for a baseball game that needs 18 people, servers 210, 220 A-C do not trigger the event because 18 people commit. Instead, servers 210, 220 A-C base whether or not to trigger the event on the event host input that a 90% likelihood that the event-host specified minimum 18 attendees will actually attend. Servers 210, 220 A-C calculate the likelihood of attendance of all the people who had committed and whether at least a 90% likelihood exists that 18 people will attend.

In one or more non-limiting embodiments, to calculate the likelihood that the event-host specified minimum number of attendees will actually attend, servers 210, 220 A-C using data from databases 215, 225A-C assign virtual "coins" with a heads/tails ratio equal to the likely attendance rate for each user and performs virtual coin flips to add up the probabilities of attendance from multiple scenarios and figure out when an event has an X % chance to happen. For example, if an event has commitments from five attendees with attendance rates of 90%, 80%, 70%, 60%, and 50% respectively, servers 210, 220 A-C create five virtual coins with those probabilities of flipping heads. Then, for one sample, servers 210, 220 A-C flip all the coins to determine how many come up heads. Servers 210, 220 A-C then repeats the coin flips for a number of samples, the number of samples may be determined by a function set by the program host server computer, where the function is editable upon review by system managers who seek to optimize the use of system resources, such as users, program host server computer storage capacity, and speed in returning a reliable projection for likelihood of actual attendees.

Alternatively, the number of samples the system uses to return a reliable projection for likelihood of actual attendees may be left to system administrators to set manually as the operating strategy of the system is considered using human analysis of various factors. The system provides a good estimate for how often N number of heads are flipped, which corresponds to how often N attendees will actually attend. For example, if the system requires a host-specified minimum of 4 attendees for an event and the host specifies a 90% likelihood of 4 attendees for the system to trigger the event, the system triggers the event if it flips 4 heads at least 90/100 times.

The above described steps lead to the system housing a more complete and reliable database of event information as the number of georeferenced locations in an area grows and the system collects additional event information for the locations.

In one or more non-limiting embodiments, event/location database query system API 164, through a device display 130 displays field summary location metadata on a map using a grid to define the bounds of the location metadata. Field summary location metadata is defined as an aggregate count of database information about multiple records within defined limits. In this embodiment, the aggregate count is a single number that results from counting each location's classification within a database field for the boundary defined by a user specified map grid square. The single numbers of interest are the locations that "never has events," "has no events," and "has events." The field summary location metadata allows a map to be displayed with a visible grid square, a single number displayed representing all database records that exist with that grid square (aggregate count), and for the location classification, an aggregate count for each of the three discrete classes.

Figure 5A:
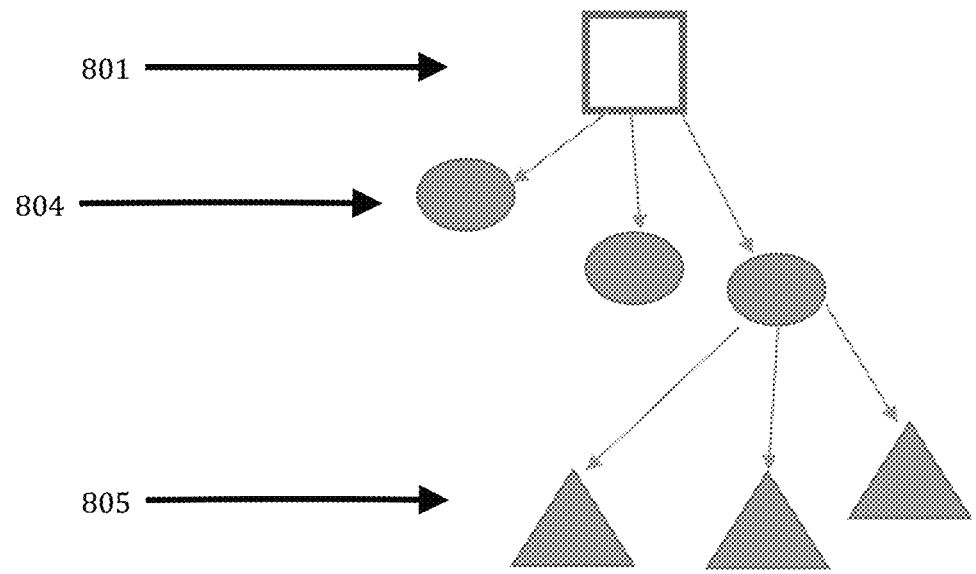
FIG. 5A-5C depict organizational trees of how the system organizes location and event information and builds the location-event tree in a database.
Figure 5B:
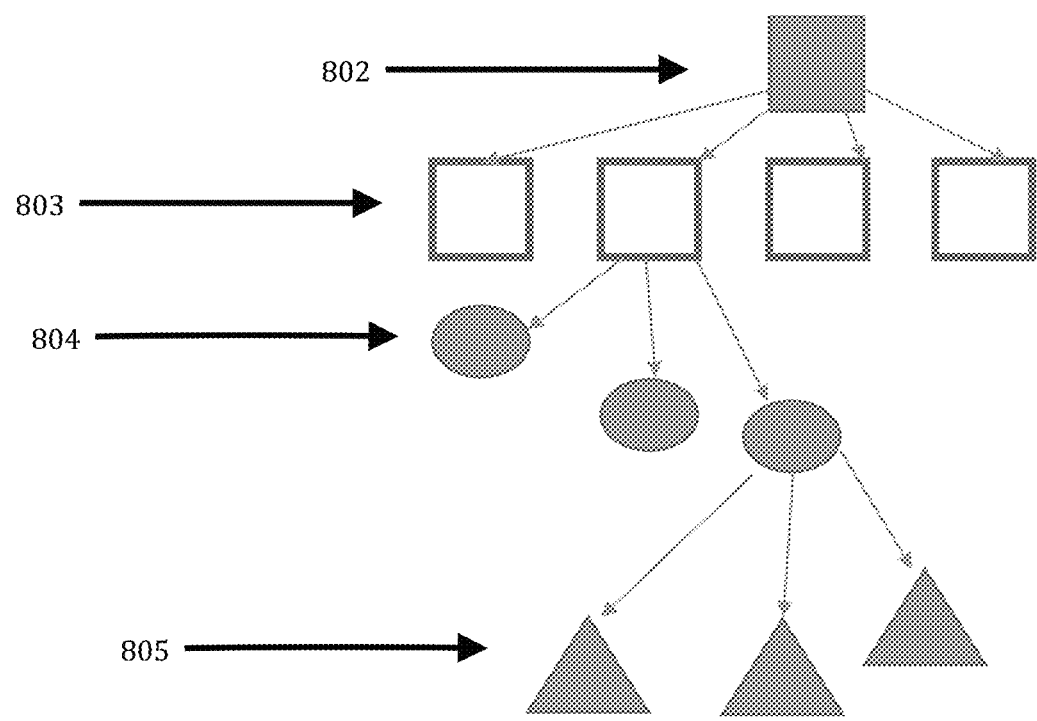
Figure 5C:
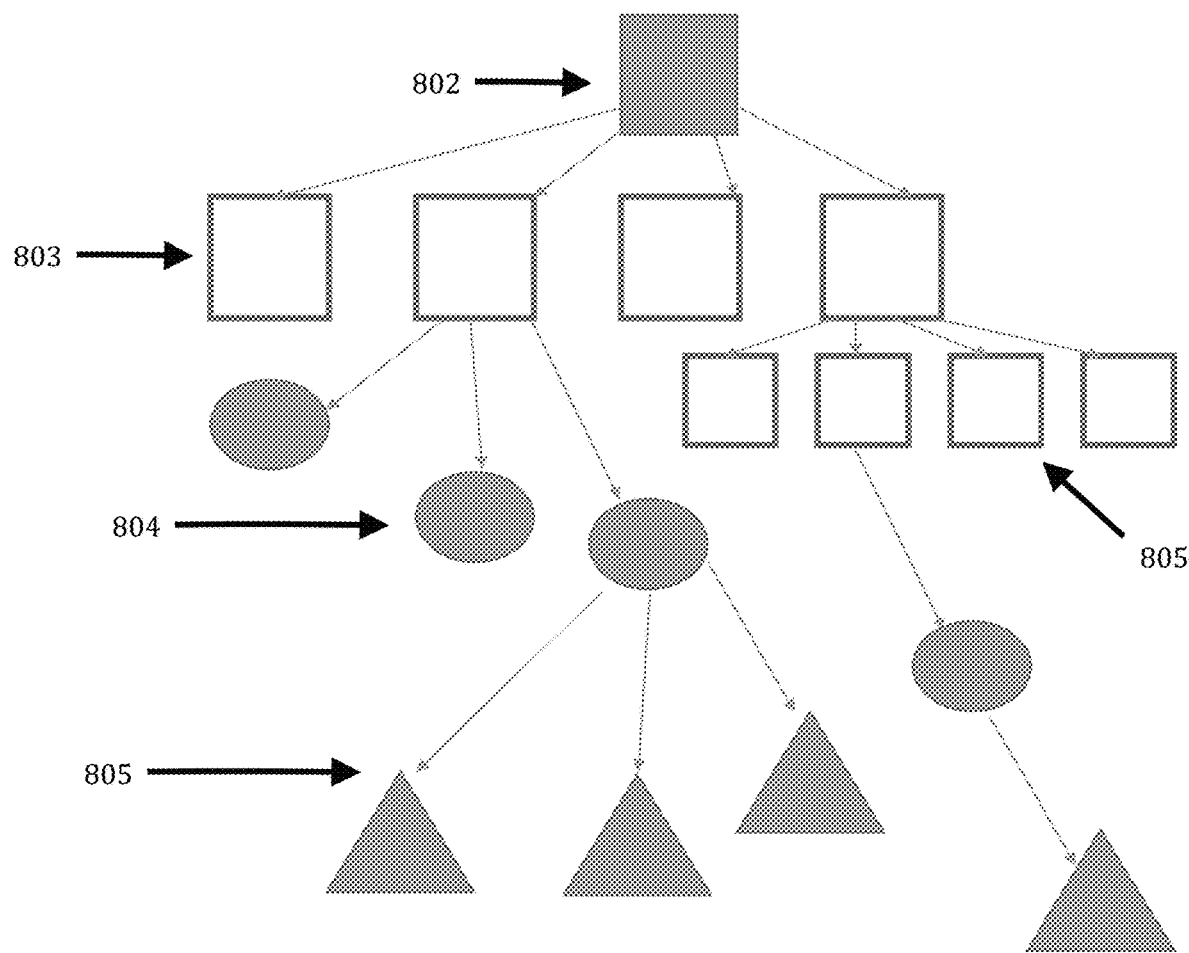

The hierarchical structure of databases 215, 225A-C as illustrated in FIG. 5A, FIG. 5B, FIG. 5C allows system 200 to condense the information contained within the bounds of a grid square from many database entries of event locations to a single number of one event location class to display. Steps described herein explain how the system references this information in the database for a grid square and includes the step of reporting certain event information back up the tree which allows a grid square to include an easily referenced count for all locations within it having a single classification type.

FIGS. 5A, 5B, and 5C provide a visual representation of how an embodiment of system 200 organizes location and event information and builds the location-event tree in databases 215, 225A-C using four types of nodes illustrated and described in FIG. 6. To refine metadata (e.g. the aggregate count for locations that have event information) for a given square on a map, event/location database query system API 164 references databases 215, 225A-C as to which grid square 802 to use to define the GPS coordinate boundary for the search by using client-defined latitude/longitude to the corresponding zoom level for a square, and fetches the aggregate counts that have been reported up from the children grid squares to that square. One example of how event/location database query system API 164 receives client-defined latitude/longitude is a pointer click on a map location to anchor a grid square. Another example of how event/location database query system API 164 receives client-defined latitude/longitude is a client inputting specific latitude/longitude coordinates to anchor a grid square. In one or more non-limiting embodiments, anchoring a grid square involves setting the geometric center of the square. The representation of the system database organizational tree shows one scheme that shows one grid square 801 having three locations 804, and three events 805 at one of those locations 804 and another scheme one having grid square 802 that has been subdivided into four parts 803, three locations in one of those subdivision grid squares 803, and three events 805 at one of those locations 804. Within FIG. 5, more locations and events may be implied by the addition of subdivision grid square and event branches from the grid square level, but not shown in the other grid squares.

The top-level grid square 802 might be, for example, a 1 mile by 1 mile area, which has been subdivided into four 0.5 mile by 0.5 mile areas 803. The top-level grid square is the total viewable area event/location database query system API 164 displays to the client, and the area shown is affected by whether a client chooses to zoom into an area of interest or zoom out to increase the physical area shown in the viewable area. Grid squares may be zoomed into at multiple levels, as broad as the top-level square of 100 miles by 100 miles, down to a single grid square size of 0.03125 miles by 0.03125 miles at increments that decrease at a rate that halves the previous square dimension and increases by doubling the previous square dimension.

Figure 7:
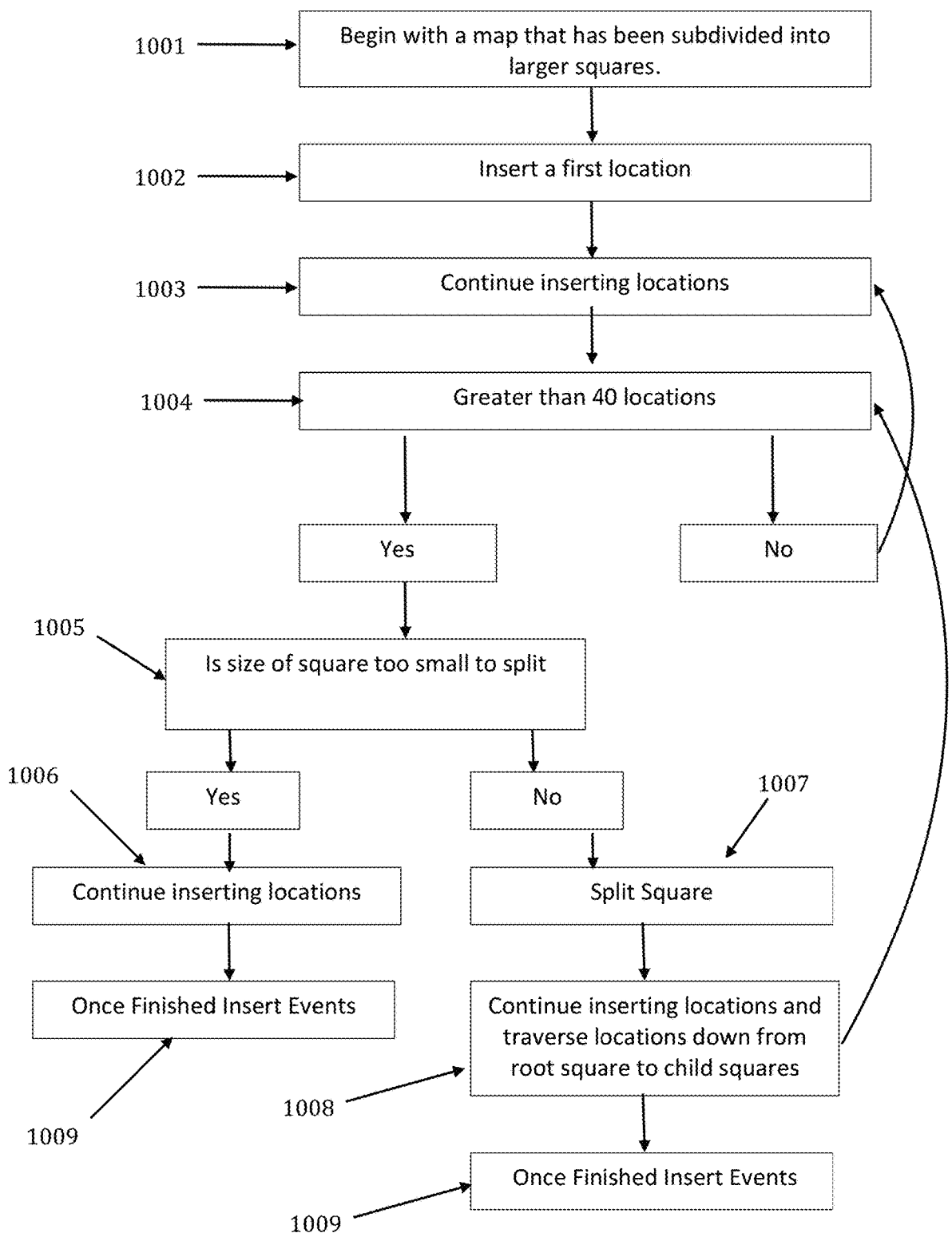
FIG. 7 depicts a flow diagram for organizing location and event information to building the organizational tree in a database.

A step-by-step example of how servers 210, 220 A-C and databases 215, 225A-C use the hierarchical structure of FIG. 5A-5C to organize data is illustrated in FIG. 7. For this embodiment, there may be a set maximum number of 40 locations in a square.

At step 1001 the method may include, starting with a map generated by servers 210, 220 A-C that have been subdivided into some very large geographic squares 801, e.g. a large pre-segmentation of the earth into 100 mi×100 mi squares.

At step 1002 the method may include, inserting a first location 804, whereby databases 215, 225A-C receive input georeference information by methods earlier described. Fetching the top-level square 801 in which the location is located and adding location 804 as a child location 804 of top-level square 801.

At step 1003 the method may include, inserting another location 804. Fetching the top-level square 801 in which the location 804 is located, and if the location is not a duplicate of another child location 804 in top-level square 801, adding location 804 as a child of top-level square 801. Locations 804 continue to be added until a top-level square 801 has 40 locations inserted.

At step 1004 the method may include inserting a 41st location 804. It is then determined if a top-level square 801 has greater than 40 locations? If no, continuing to insert locations 804 at step 1003.

If yes, the method may include, determining if the top-level square 801 having 41 locations inserted is of a size that may be too small to split (e.g. less than 0.03125 mi) at step 1005? If yes, continuing to insert locations 804 that are located in top level square 801 at step 1006 (some latitudes/longitudes just contain many locations, e.g. a multi-story building with many event locations sharing GPS coordinates). If no, then split top level square 801 into four equal child squares 803 at step 1007. For example, if top-level square 801 was a square area of 100 miles×100 miles then the child squares 803 would be 50 miles×50 miles.

The top-level square 801 that has been split is replaced with a root square 802 signifying that the square is now a parent and four equal child squares 803 as children of root square 802 have been added. In addition, all 41 locations 804 fall under the corresponding child squares 802 that the locations 804 are located.

At step 1008 the method may include, inserting another location 804 into a square. At step 1008 the method may include, determining if the square that location 804 has been inserted into is a root square 802 such that it is a parent of other child squares 803. If yes, then location 804 traverses down the hierarchical tree and inserted into child square 803 of the previous square. This step is repeated until location 804 is inserted into the proper child square 803. If the root square 802 is not a parent of other child squares 803, the location is inserted into the child square as a child location 804 of child square 803. The above process for entering locations is repeated until a square has 41 locations inserted whereby then it is determined if the square is of a size that may be too small to split (e.g. less than 0.03125 mi)? If yes, continue to insert locations 804 that are located in square. If no, then square is split into four equal child squares, as illustrated in FIG. 5C and repeat step.

At step 1009 the method may include inserting event 805 for a location 804. Event/location database query system API 164 traverses the tree to find the location for the event, inserts event 805 as a child of location 804, and traverses back up the tree, updating event counts for each square.

Event/location database query system API 164 on a client computing device 205 display may subdivide locations into a grid to display location metadata on a map in a way that makes it visually clear where a location information or event information gap exists. In subdividing locations into a grid to display location metadata on a map, and reporting crucial, but minimal, analytical information up the tree, event/location database query system API 164 makes the data manageable to present on a client computing device 205.

In one or more non-limiting embodiments, databases 215, 225A-C group the metadata in a way that efficiently allocates computational capacity to each user query. In one embodiment, a given geographic area, e.g. the city of Seattle, might include within its boundaries millions of locations to be categorized with respect to whether they host events, and whether details about those events are known.

Figure 8:
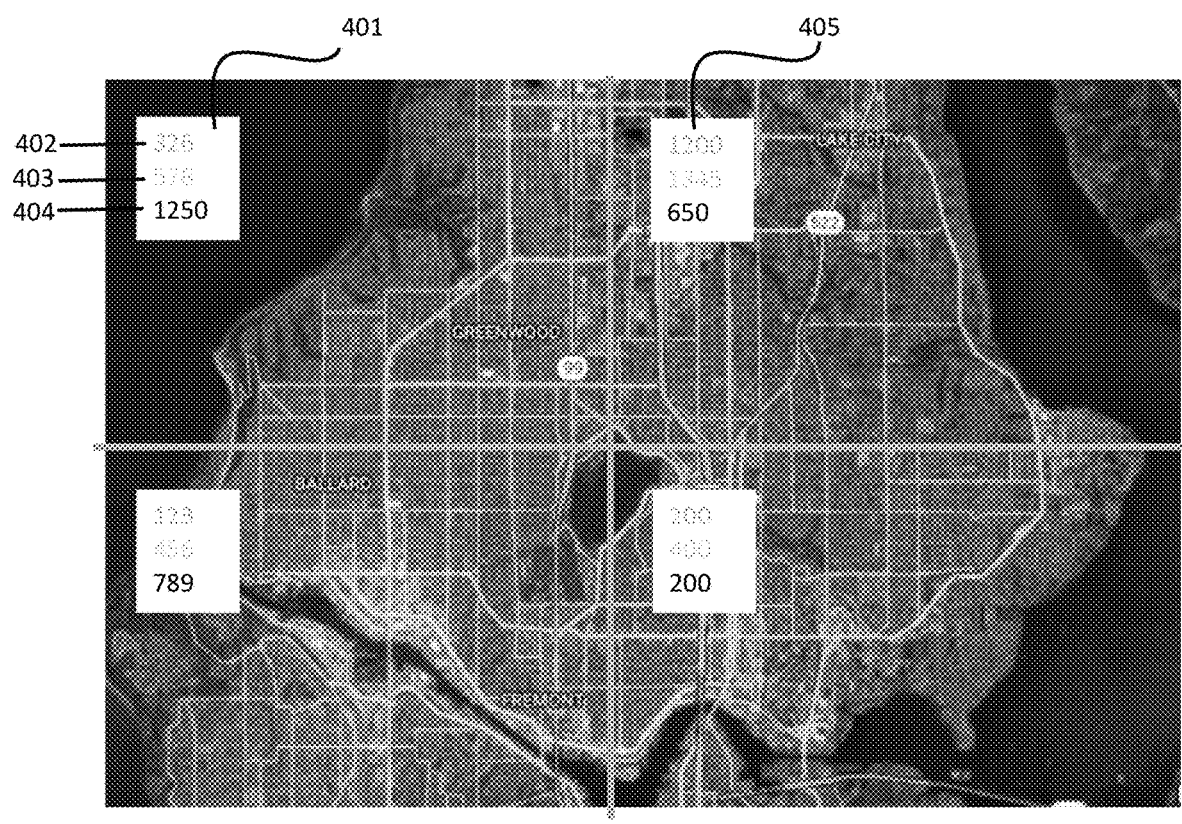
FIG. 8 depicts a screenshot of prior art in the form of contemporary online GPS-based map service interface with grouped individual location markers.

Grouping individual locations with respect to one common field of metadata and showing a number of database records for a search area is currently available using contemporary online GPS-based map services (See FIG. 8). However, a client computing device 205, through event/location database query system API 164 of the present disclosure may display metadata about thousands to millions of locations using a client-defined geographic display area to determine the portion of the event location database on which the search is performed, and returns only an aggregate count of all databases 215, 225A-C record for a field for a grid subdivision 501 to display.

Databases 215, 225A-C may provide structure and accessibility for the location metadata and display how much event information users have inputted in any selected geographic region (FIG. 8). This allows a user an intuitive indication of an area where less event information is known.

In some implementations, servers 210, 220 A-C may analyze information in databases 215, 225A-C to go further in comparing and prioritizing geographic areas with an information gap. For example, an information gap may exist in a certain geographic region known to have event hosting locations where a relatively low amount of event information is known, which may be evidenced by a high number of locations classified as "has no events" 405 relative to adjacent geographic areas of similar area 401 or by a high number of locations classified "has no events" 403 relative to the number of locations classified as "has events" 402. System definition of whether an area is identified to users as having relatively low event information may be a function set by the program host server computer, where the function optimizes the use of system resources, such as users, program host server computer storage capacity, and speed in returning a result from a query.

Concerning the function that identifies an area of relatively low event information, an example of such a function may be that an area defined by the system with a grid square has a number of locations classified as "has no events" that is greater than three standard deviations more than the count for locations classified as "has no events" in adjacent and abutting grid squares of the same size. When the system uses parameters such as resources, users, program host server computer storage capacity, and speed in returning a result from a query to prioritize an area of relatively low event information, the system, through the event/location database query system API 164, may send users that are local to the area of relatively low event information a request for additional input with reference to certain locations classified as "has no events."

Figure 9:
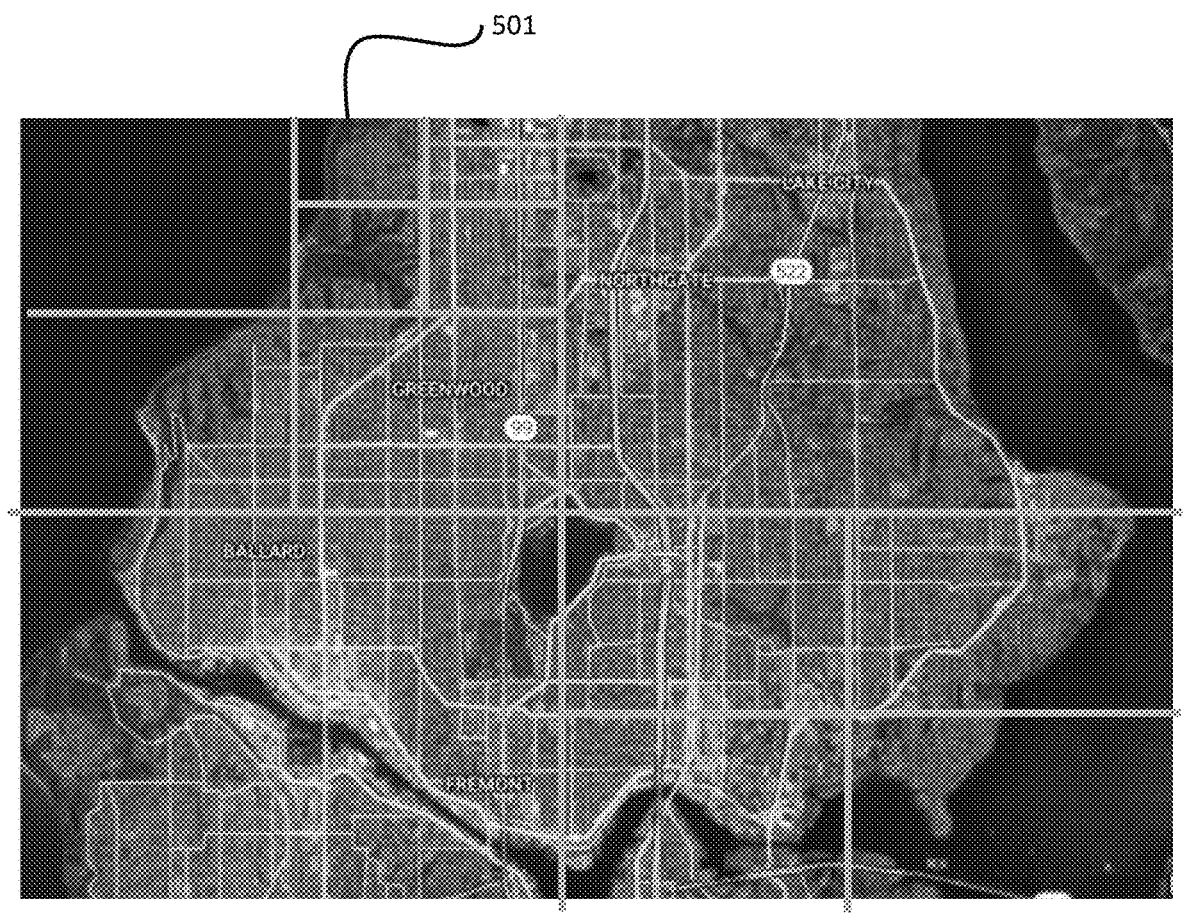
FIG. 9 depicts a satellite image of a city, with grid lines separating the different areas with tagged locations.
Figure 10:
FIG. 10 depicts the system architecture interface with sample grid subdivisions.

A user is local to an area if they have attended an event, updated event information, or changed location classification within the boundaries of the system specified area of relatively low event information. Alternatively, system definition of whether an area is identified to users as having relatively low event information may be left to system administrators to set manually as the operating strategy of the system is considered using human analysis of various factors. An example of an operating strategy for the system may be to focus resources on more populated areas even if the user queries for the area are low, because the system is establishing itself in a new market and user queries will follow location and event information acquisition FIG. 9 and FIG. 10 depict how event/location database query system API 164 displays the location metadata on a map grid. In one or more non-limiting embodiments, the event/location database query system API 164 displays information on a map by subdividing it into a grid. Information may be displayed on map with different indicators such as color, shapes, font, or change in appearance to distinguish themselves from other information. For example as illustrated in FIG. 8 on this map, green may represent the number of locations for which databases 215, 225A-C have classified as having event information 402, yellow may represent locations for which databases 215, 225A-C have classified as not having event information 403, and black may represent the locations for which databases 215, 225A-C have classified as not having events 404.

In the top-left corner 401 of FIG. 9, databases 215, 225A-C may include event information for three hundred twenty-six locations 402, databases 215, 225A-C do not have upcoming event information for five hundred seventy-eight locations 403, and databases 215, 225A-C have classified one thousand two hundred fifty locations as never having events 404.

As shown in FIG. 9, when zooming in on a given grid square, the map becomes subdivided so that the system's 200 event/location database query system API 164 displays more granular location-based metadata 501. Subdivision may be performed until the grid square contains a number of locations manageable for event/location database query system API 164 to display on the map itself, instead of using only the aggregate counts for location classes, with respect to a system defined maximum time to process the results sent by the program host server computer, or until the square would be too small to subdivide according to the system definition of a minimum grid square size. Different grid squares might be subdivided to different levels, so that the structure appears as in the different subdivisions of the upper left quadrant of the view in 501 of FIG. 10. Each grid in the map would contain less than a specified maximum number of locations, N, and set up to only display the smaller subdivisions as a client zooms in.

Displaying the information in a grid on a map as shown in FIG. 8 allows for the visualization of how much event information the system has or is missing in specific regions. In one or more non-limiting embodiments, servers 210, 220 A-C analyze location and event information, and through event/location database query system API 164, encourages users to seek out and input additional information for a target area using various strategies, e.g. targeting areas where little location information or event information exists in the system (information gaps) or targeting high value areas. For example, whether an area is a high value area may be determined by a substantially high number of user queries directed to a geographic area, thus creating an area with high value location information, or a high value area may be determined by a substantially high number of system user queries directed to certain events, thus creating high value event information, in both cases the high value deriving from the higher demand for the location information and event information. By displaying or even directing users to areas with information gaps or high value areas, the system maximizes user data contributions to improve database information in areas users care most about.

To direct users to areas with information gaps or high value information, the system refers to measured parameters such as resources (computational, network, etc.), users, program host server computer storage capacity, and speed in returning a result from a query to prioritize an area with information gaps or with high value information. The system may then send users who are local to the area with information gaps or high value information a request for additional input with reference to certain locations classified as "has no events." A user is local to an area if they have attended an event, updated event information, or changed location classification within the boundaries of the system specified area of relatively low event information. A user may also be determined to be local to an area by program host server computer verifying the location of user by receiving transmission from a global positioning system (GPS) on client computing device 205

In one or more non-limiting embodiments, event/location database query system API 164 may also identify and send request to only specific users such as fifty users who have already fulfilled a request for additional input with reference to certain locations classified as "has no events," or users who match the specific need for criteria such as age, profession, language, background, or other information. Program host server computer may identify users meeting the criteria accordingly. If more users that are local or meet the criteria than are needed, the requests may be sent randomly or to users who have fulfilled the most requests to further improve quality and accuracy. Program host server computer may calculate and disburse payments to users fulfilling requests whereby event/location database query system API 164 may provide an indication of the payment to be provided to the user if user performs the task and then event/location database query system API 164 provides payment to user in response to receiving a fulfilled request from user for additional input with reference to certain locations classified as "has no events."

System definition of what constitutes a substantially high number of system user queries may be a function set by program host server computer, where the function is editable upon review by system managers who seek to optimize the use of system resources, such as users, program host server computer storage capacity, and speed in returning a result from a query. For example, the system definition for a substantially high number of system user queries may be set as a function that identifies locations, events, or areas that have a number of user queries for them that is greater than three standard deviations above the mean number of user queries for locations, events, or areas in abutting and adjacent grid squares of the same size.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated. The scope of the invention is to be defined by the claims.

What is claimed is:

1. A method of building an event and location information database, said method comprising:
creating an event and location tracking and management system, the event and location tracking and management system having one or more processors; one or more memory devices coupled to the one or more processors; and one or more computerized programs, wherein the one or more computerized programs are stored in the one or more memory devices and configured to be executed by the one or more processors, the one or more computerized programs including instructions;
determining a high value area from a number of user queries directed to a geographic area;
generating, by the event and location tracking and management system, a map;
partitioning, by the event and location tracking and management system, the map into an initial grid that is composed of one or more first regions having a certain area corresponding to an area in a real world;
receiving, by the event and location tracking and management system, a location corresponding to a real world geographical location;
identifying, by the event and location tracking and management system, a first region of the one or more first regions into which the location is insertable wherein the location is located within that first region based on the real world geographical location;
performing, by the event and location tracking and management system, a region subdivision scheme in response to one of the one or more first regions having greater than a predetermined number of locations inserted into the first region and the first region is of a predetermined size creating one or more second regions from the first region, the one or more second regions having a smaller corresponding real-world area than the corresponding real-world area of the first region;
inserting, by the event and location tracking and management system, a location into a second region of the one or more second regions when the one or more second regions have been created from the region subdivision scheme of the first region;
inserting, by the event and location tracking and management system, a real world event at the location; and in response to inserting the real world event for the location, the a real world event becoming visible in the first region and the second region;
classifying the location as a location with events class, has no events class, or never has events class;
reclassifying the has no events class to the never has events class in response to the event and location tracking and management system verifying whether the location hosts real world events by running a cross-reference search or sending an automated inquiry to determine if the location does not host events; and
identifying, by the event and location tracking and management system, an area having locations having an amount of the real world events below a predetermined threshold.

2. The method of claim 1, further comprising:
repeating said receiving, identifying, and inserting steps using said first and second regions;
performing a second region subdivision scheme, by the event and location tracking and management system, when the one or more second regions has a predetermined number of locations and is of a predetermined size, creating one or more third regions from the second region;
inserting the location into the third region, by the event and location tracking and management system, when the one or more third regions have been created from the second region subdivision scheme of the second region; and
inserting, by the event and location tracking and management system, another real world event for the location; and in response to inserting the another real world event for the location, the another real world event visible in the first region, the second region, and the third region.

3. The method of claim 2, further comprising setting a function to define a high number of the user queries as greater than three standard deviations above a mean number of second user queries for locations, events, or areas in abutting and adjacent grid squares of a same size.

4. The method of claim 2, further comprising displaying on the map, field summary location metadata which is displayed with a visible grid square, wherein the field summary location metadata includes a number displayed representing all database records that exist with that grid square and a number for an aggregate count for the with events class, the has no events class, and the never has events class separately.

5. The method of claim 1, further comprising:
determining, by received local classification information, that the user is local to the area having locations with an amount of real world events below a predetermined threshold;
in response to determining the user is local to the area having locations with an amount of real world events below a predetermined threshold, transmitting a request to the user a task to provide real world event information for the locations in the area having locations with an amount of real world events below a predetermined threshold, the request having an indication of a payment to be provided to the user if the user performs the task; and
providing the payment to user in response to receiving a fulfilled request from the user.

6. The method of claim 5, wherein the user is further determined to be local by having attended an event or has updated event information within boundaries of the locations with an amount of real world events below a predetermined threshold wherein a subset of individuals that are local is chosen at random to have the request transmitted to them.

7. The method of claim 6, wherein the subset of individuals is determined by selection criteria comprising age, profession, language, and background.

8. A system for managing event data comprising: one or more hardware processors; one or more memory devices coupled to the one or more hardware processors; and one or more computerized programs, wherein the one or more computerized programs are stored in the one or more memory devices and configured to be executed by the one or more hardware processors, the one or more computerized programs including instructions for:
determining a high value area from a number of user queries directed to a geographic area;
generating a map;
partitioning the map into an initial grid that is composed of one or more first regions having a certain area;

receiving a location corresponding to a real world geographical location;

identifying a first region of the one or more first regions into which location is insertable wherein the location is located within that first region;

performing a region subdivision scheme when one of the one or more first regions has greater than a predetermined number of locations inserted and is of a predetermined size, which creates one or more second regions from the first region, the one or more second regions smaller than the first region;

inserting, by the event and location tracking and management system, the location into a second region of the one or more second regions when the one or more second regions have been created from the region subdivision scheme of the first region;

inserting, by the event and location tracking and management system, another real world event for the location; and in response to inserting the another real world event for the location, the another real world event visible in the first region, the second region, and the third region;

classifying the location as a location with events class, has no events class, or never has events class; and reclassifying the has no events class to the never has events class in response to the system verifying whether the location hosts real world events by running a cross-reference search or sending an automated inquiry to determine if the location does not host events; and identifying, by the event and location tracking and management system, an area having locations having an amount of the real world events below a predetermined threshold.

9. The system of claim 8, wherein the region subdivision scheme is uniform spacial subdivision scheme wherein four second regions are created from the first region and four third regions are created from the second region.

10. The system of claim 8, wherein the map further comprises a visible grid square and numbers for all database records that exist within that grid square, including aggregate numbers for locations that never have real world events, locations that have no real world events, and locations that have real world events.

11. The system of claim 10, wherein an area of relatively low real world event information is defined by a grid square having a number of locations that have no real world events is greater than three standard deviations more than a count for locations that has no real world events in adjacent and abutting grid squares of a same size.

12. The system of claim 11, wherein an event/location database query system API sends a request to one or more users for additional input with reference to certain locations that have no real world events.

13. The system of claim 12, wherein the event/location database query system API sends a request to one or more users who are local to an area, wherein the user is local to the area if they have attended an real world event, updated real world event information, or changed location classification within boundaries of a system specified area of relatively low real world event information through the event/location database query system API.

* * * * *